United States Patent [19]
Saito

[11] Patent Number: 5,153,729
[45] Date of Patent: Oct. 6, 1992

[54] DIGITAL ELECTRONIC STILL CAMERA AUTOMATICALLY DETERMINING CONDITIONS OF A MEMORY CARTRIDGE

[75] Inventor: Osamu Saito, Tokyo, Japan

[73] Assignee: Fuji Photo Film Co., Ltd., Minami-Ashigara, Japan

[21] Appl. No.: 649,339

[22] Filed: Feb. 1, 1991

Related U.S. Application Data

[63] Continuation of Ser. No. 424,175, Oct. 19, 1989, abandoned.

[30] Foreign Application Priority Data

Oct. 24, 1988 [JP] Japan .................. 63-266094

[51] Int. Cl.⁵ .................. H04N 5/30; H04N 5/225
[52] U.S. Cl. .................. 358/209; 358/909
[58] Field of Search ............ 358/209, 906, 909, 229, 358/335, 41; 365/52; 235/492; 364/708

[56] References Cited

U.S. PATENT DOCUMENTS

| | | | |
|---|---|---|---|
| 4,456,931 | 6/1984 | Toyoda et al. | 358/335 |
| 4,489,351 | 12/1984 | d'Alayer de Costemore d'Arc | 358/209 |
| 4,647,976 | 3/1987 | Nakagaki et al. | 358/909 |
| 4,675,747 | 6/1987 | Hanma et al. | 358/909 |
| 4,746,993 | 5/1988 | Tada | 358/909 |
| 4,758,883 | 7/1988 | Kawahara et al. | 358/209 |
| 4,803,554 | 2/1989 | Pape | 358/909 |
| 4,887,161 | 12/1989 | Watanabe et al. | 358/906 |
| 4,907,231 | 3/1990 | Watanabe et al. | 371/24 |
| 4,916,662 | 4/1990 | Mizuta | 365/52 |
| 5,018,017 | 5/1991 | Sasaki et al. | 358/209 |
| 5,034,804 | 7/1991 | Sasaki et al. | 358/41 |

FOREIGN PATENT DOCUMENTS 64-44587  2/1989  Japan .

*Primary Examiner*—James J. Groody
*Assistant Examiner*—Safet Metjahic

[57] ABSTRACT

A digital electronic still camera has a detachably loaded memory cartridge. The cartridge includes control data representative of its status. The camera has an imaging unit for shooting an object field to produce an image signal. The image signal is connected into digital image data. A connector detachably connects the memory cartridge to a converter. A manual operation unit responsive to manual operation can generate a first instruction signal for preparation for shooting by the imaging unit and a second instruction signal to instruct shooting to be achieved by the imaging unit. A controller responsive to the manual operation unit for controlling the imaging unit and the signal converter to store the image data in the memory cartridge. When the first instruction signal from the operation unit is received, the controller reads out the control data from the memory cartridge. When the second instruction signal is received, the controller stores in the memory cartridge the image data from the signal converter depending upon the control data read out from the memory cartridge.

8 Claims, 2 Drawing Sheets

DIGITAL ELECTRONIC STILL CAMERA AUTOMATICALLY DETERMINING CONDITIONS OF A MEMORY CARTRIDGE

This application is a continuation of application Ser. No. 07/424,175 filed on Oct. 19, 1989, now abandoned.

BACKGROUND OF THE INVENTION

1. Field of the Invention

The present invention is directed to a digital electronic still camera. In particular, to a digital electronic still camera which has a memory cartridge detachably loaded therein. After an object field is shot image data representing the object field is stored in the memory cartridge.

2. Description of the Prior Art

A digital electronic still camera is an imaging apparatus which shoots an object field by using a solid-state imaging device such as a charge-coupled device, device. The CCD stores in memory an image signal representing the object field in the form of digital data. The memory employed in this apparatus is implemented in many cases as a memory card including a random-access memory, for example a semiconductor memory. In this situation to effectively use a storage area of memory, the data is usually compressed through data compression by use of an orthogonal conversion, encoding and a quantization of data.

Heretofore, in a digital electronic still camera to record and to reproduce image signals, for example, as shown in FIG. 2 of Japanese Patent Laid-Open Publication No. 44587/1989 in the name of the same assignee as that of the present application, a memory cartridge having a semiconductor memory is used as an image data recording medium. The publication noted above includes a method whereby the image data, information items such as a memory type, a memory capacity and a battery expiration date are stored.

The electronic camera may be structured so that the body of the camera has a detachably loaded memory cartridge carrying the information items. In such a system, according to a conventional method, in order to avoid an incorrect operation which may, for example, destroy recorded image data, the operator must take precautions. Prior to the installation of the cartridge, the operator must perform tedious operations to confirm various conditions such as the date, an image quality mode associated with a data compression method of the image data and a free storage area of the memory.

SUMMARY OF THE INVENTION

It is therefore an object of the present invention to provide a digital electronic still camera which do require the operations in the conventional technology in order to confirm the states of the memory cartridge, thereby developing excellent operability.

In accordance with the present invention, in a digital electronic still camera, a memory cartridge contains control data representing a status thereof. The digital electronic still camera includes imaging means for shooting an object field to produce an image signal representing the object field. There are convertor means for converting the image signal into digital image data associated with the image signal. Connector means are used for detachably connecting the memory cartridge to the signal convertor means. Manual operation means responsive to a manual operation first to produce a first instruction signal for preparation for shooting by said imaging means and next to generate a second instruction signal for instrcting the shooting by said imaging means. The control means are responsive to said manual operation means for controlling the imaging means. The signal convertor means stores the image data in the memory to cartridge and the control means when it receives the first instruction signal from said manual operation means, control data from the memory cartridge is read out. When the second instruction signal is received the image data from said signal convertor means is stored in the memory cartridge depending on the control data read out from the memory cartridge.

A digital electronic camera in accordance with the present invention may have, in place of the manual operation means mentioned above, manual operation means for creating an instruction signal to instruct a shooting by the imaging means. In place of the control means set forth above, included in the camera may be control means which, when a memory cartridge is connected to connector means reads out control data from the memory cartridge. When the memory cartridge receives an instruction signal from the manual from operation means, it stores image data from the signal convertor means in the memory cartridge according to the control data read out from the memory cartridge.

In addition, in accordance with the present invention, a memory loaded with control data is connected to a digital electronic still camera by use of connector means.

BRIEF DECRIPTION OF THE DRAWINGS

The objects and features of the present invention will become more apparent from the consideration of the following detailed description taken in conjunction with the accompanying drawings in which:

FIG. 1 is a schematic functional block diagram showing an embodiment of a digital electronic still camera in accordance with the present invention; and FIG. 2 is an explanatory diagram useful for understanding a layout example of a storage area in a memory cartridge of the embodiment shown in FIG. 1.

DESCRIPTION OF THE PREFERRED EMBODIMENT

Figure 1:
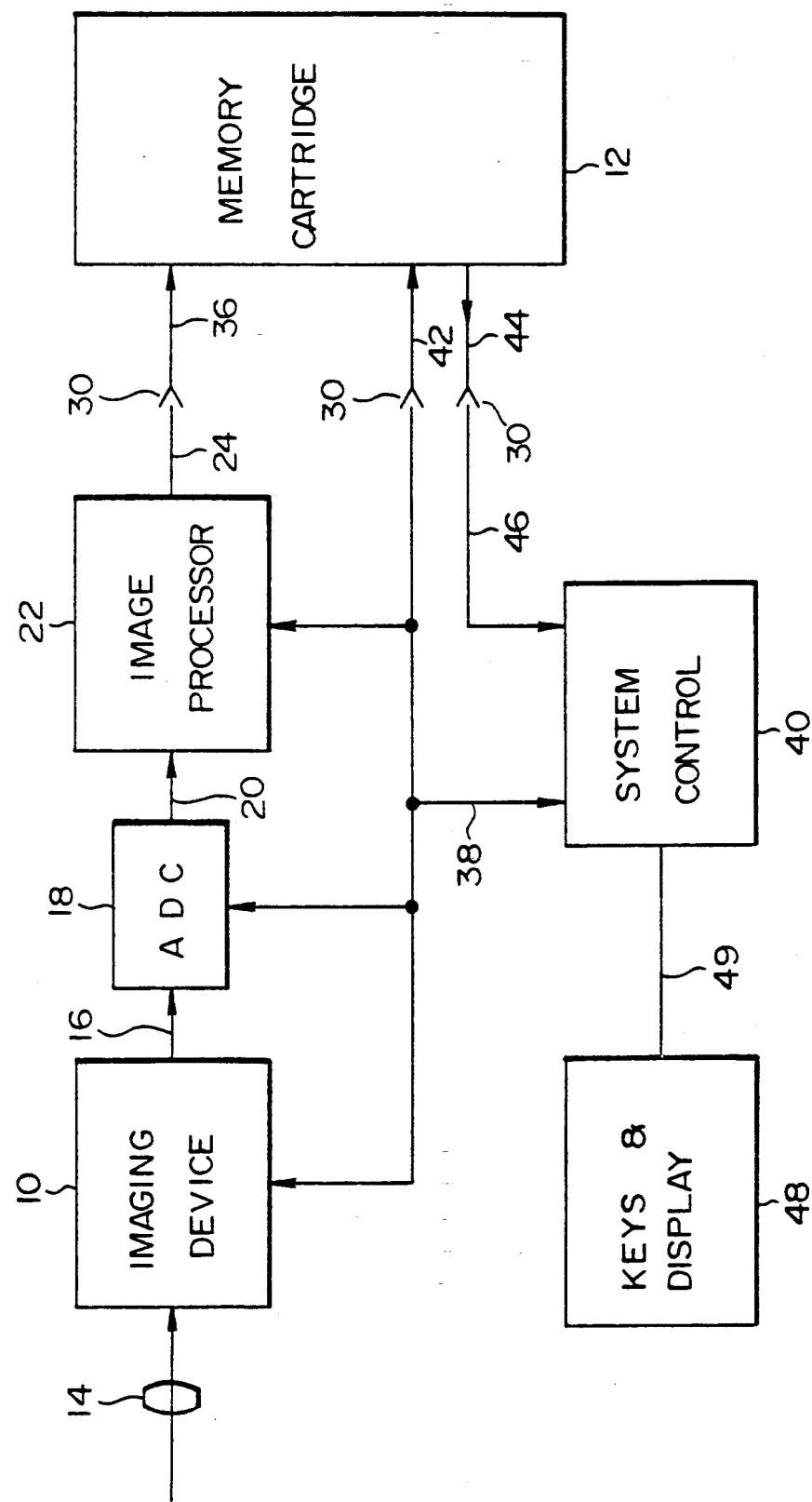

In FIG. 1, the emodiment of a digital electronic still camera includes an imaging device 10 for shooting an object field to produce an image signal representing the object field. The image signal is stored in the form of digital data in a memory cartridge 12. As the imaging device 10, a solid-state imaging device, such as a charge-coupled device, device, is advantageously employed to shoot the object field through an imaging lens 14. This produce a color image signal representing the object field so as to develop as an output 16 therefrom the signal in the form of color component signals including red, R: green, G; and blue, B. These color component signals are produced in a raster scanning fashion similar to the type used for television signals. Since other functional sections such as an exposure mechanism including a shutter and an iris, and a focusing mechanism are not directly related to understanding of the present invention, a detailed description is not given.

Figure 2:
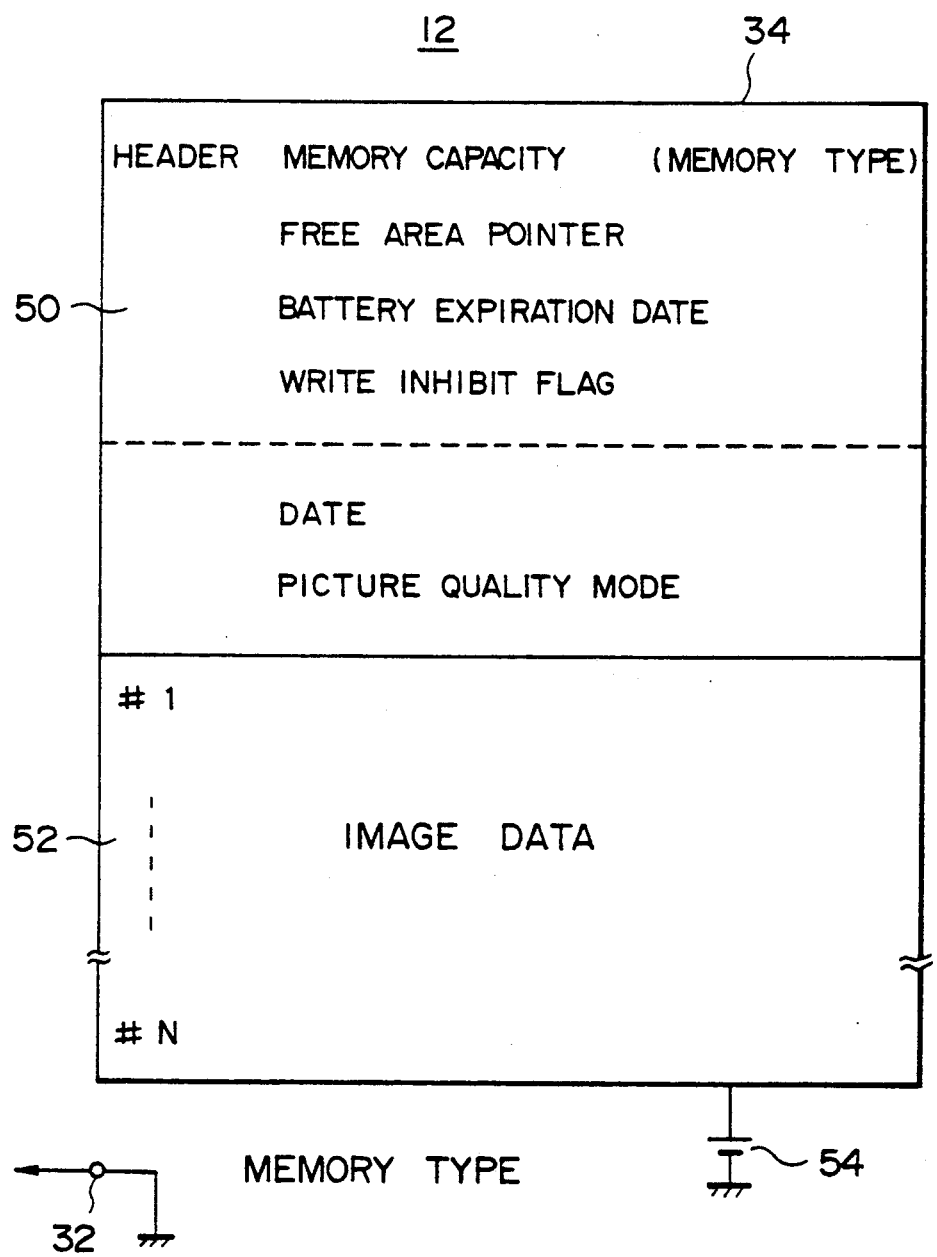

The memory cartridge 12 is a storage configured in a memory card or a package in which a semiconductor memory device is supported on a card-shaped base or in a package, respectively. These configurations are collectively referred to as a memory cartridge in this specification. As a semiconductor memory device, various semiconductor memories such as an SRAM and an EEPROM are advantageously used. The memory cartridge 12 is installed in the camera body by use of a connector 30. In this embodiment, a cartridge 12 of any memory type may be connected to the body. A memory type associated with a specific memory cartridge 12 is indicated, for example, by grounding a particular connector terminal 32 included in the connector 30 of the cartridge 12 as shown in FIG. 2. Alternatively, without grounding the particular terminal, the memory type may be written in a storage area of the memory 12.

In FIG. 1, the imaging device 10 produces an output 16 connected to an analog-to-digital converter, converter 18. The converter 18 converts the received analog image signal into digital data associated with the former signal, thereby producing the digital data from an output 20. The digital data is encoded, for example, into 8-bit codes for respective ones of the color component signals R, G and B. Digital data output 20 is fed to an image processor 22.

In this embodiment, the image processor 22 conducts a preprocessing such as a white balance adjustment and gradation correction, a luminance and color difference processing for converting color component signal data into a luminance signal and a two-phase color diffrence signal, and a signal conversion processing to conduct an image processing such as a data compression and a transmission processing so as to develop the resultant signal from an output 24. For the data compression, an orthogonal conversion and encoding, such as a two-dimensional discrete cosine conversion and a quantization, are advantageously employed. The transmission processing includes, for example, processing to select a data transfer rate associated with a memory type of the memory cartridge 12.

Detachably connected by connector 30 to the output 24 from the image processor 22 is a data write port 36 of the memory cartridge 12. With the provision above, image data undergoing the data compression and the quantization is developed from the image processor 22 so as to be stored in the memory cartridge 12.

The imaging device 10, the analog-to-digital converter 18 and the image processor 22 are connected to a system controller 40 by control lines 38. The system controller 40 supervises and controls overall system operations of the present apparatus. The control lines 38 from the controller 40 are also connected via the connector 30 to a control input 42 of the memory cartridge 12. The control lines 38 are disposed to supply these constituent elements with various control signals including a synchronous clock, a memory address, and write and read instructions from the controller 40 and to transfer status signals indicating status of the associated elements to the controller 40.

Also connected to the system controller via the connector 30 is a data output line 44 from the memory cartridge 12. The data output line 44 includes a data read line to deliver various data obtained from the storage area 34 of the memory 12 to an input 46 of the controller 40, and a data line linked to the terminal 32 for information indicating the memory type described above. Based on the data input 46, the system controller 40 can determine the conditions of the memory cartridge 12.

Additionally, system controller 40 is connected to a keys and display unit 48, which includes such operation buttons necessary to input instructions from the operator to this apparatus as a shutter release button of the camera and date setting keys thereof, not shown, and a display device for visually or audibly supplying the operator with the conditions of the apparatus including a status of a battery 54 of the memory cartridge 12 and a free storage capacity thereof. For example, the shutter release button may be constituted to develop a two-stroke operation. As will be described later, the system control 40 may be configured in this embodiment to read out data from the memory cartridge 12 in response to the first stroke of the shutter release button and then to shoot an object through a following, second stroke of the release button.

Referring now to FIG. 2, the storage area 34 of the memory cartridge 12 is subdivided into two subareas or partitions 50 and 52 in this embodiment. The area 50 is used to store a header, whereas the area 52 is disposed to store therein image data together with frame numbers #1 to #N. The information items in these areas 50 and 52 are retained by use of the battery 54.

The header 50 includes control data for the overall operations of the memory cartridge 12. The control data comprises a memory capacity of the storage area 34, a storage capacity or an address pointer of free storage locations in the storage area 34, an expiration date of the battery 54, and a write inhibit flag for permitting or inhibiting a write operation in the storage area 34. In a case where the memory type is not indicated by use of the pin number of a specific connector terminal 32, data representative of the memory type may be stored in the header field 50. Among these common control data items, the memory capacity, the memory type and the battery expiration date are written in the header field 50 when the cartridge 12 is delivered from a firm manufacturing the cartridge 12.

The header 50 also includes individual control data specific to the respective frames of the image data 52. The individual control data comprises, for example, a shooting day and time or date and a picture quality mode for each frame. The picture quality mode is used to specify a data compression system employed by the image processor 22 to store image data in the cartridge 12. The picture quality mode is disposed for the following purpose. That is, when a playback apparatus for playing back an image is loaded with a cartridge 12 in which the image data 52 is stored with a two-dimensional discrete cosine conversion specified, for example, the playback apparatus checks the picture quality mode so as to determine a data expansion system suitable for the picture quality mode.

In a shooting operation, when the operator depresses the shutter release button of the keys and display 48 to its first stroke, the keys and display unit 48 generates a first instruction signal for the preparation of a shooting so as to supply the signal to an output 49. In response to this signal, the system controller 40 first confirms the presence or absence of connection of the cartridge 12 by use of the connector terminal 32 conveying the data indicating a memory type. If the presence of connection of the cartridge 12 is confirmed, the system controller 12 sends an address and a read instruction of the header storage area 50 via the control line 42 to the memory cartridge 12 so as to read out the control data from the cartridge 12 and to deliver the data to the data output 44.

The control data obtained from the header area 50 includes data items such as a free memory capacity, a battery expiration date, and a write inhibit flag. The data of the free memory capacity is later used to determine whether or not the image data can be written in the area 52. On recognizing the presence of the free area as described above, the controller 40 writes the image data therein. If the free area is missing, the controller 40 instructs the keys and display 48 to report the condition to the operator. The display 48 then visually and/or audibly notifies the operator that the image data cannot be stored in the memory 12. When the data of the battery expiration date indicates that the battery is to be soon replaced or is already used up, the controller 40 similarly instructs the display 48 to report the condition. The display 48 then accordingly notifies the operator that the image data cannot be stored in the memory cartridge 12. This is also the case when the write inhibit flag is set.

When the shutter release button is depressed to the second stroke to instruct a shooting, the operation display 48 creates a second instruction signal to be fed to the output 49. In response thereto, the system controller 40 releases the shutter and clocks the imaging device 10 to enable the imaging device 10 to shoot an object field to produce a frame of image signal representing the object field. The image signal is fed from the imaging device 10 to the analog-to-digital converter 18, which converts the signal into digital data associated therewith. The image data is passed to the image processor 22 to undergo the preprocessing, the luminance and color difference processing, and the data correction. The resultant data is quantized so as to be delivered from the data write input 36 to the memory cartridge 12.

Additionally, the system controller 40 produces an address and a write instruction of the image data storage area 52 on the control line 42 to the memory cartridge 12. The image data from the image processor 22 is stoered together with a frame number thereof in a free region of the storage area 52. In this operation, the controller 40 sets to the image processor 22 a data transfer rate associated with a memory type previously identified. The image data is sent from the processor 22 to the cartridge 12 at the transfer rate.

In addition, the controller 40 supplies the memory cartridge 12 with data of day and time set by the keys and display 48 for measurement thereof, and data of picture quality mode indicating the data compression method employed by the image processor 22. These individual control data items are stored in the header area 50. The controller 40 further computes the resultant value of the remaining free area after the data storing operation to transfer common control data including the computed value to the memory cartridge 12. As a result, the data of the free storage capacity is updated.

In accordance with the embodiment, the system controller 40 reads out the content of the header area 50 from the memory cartridge 12 in response to the first stroke of the shutter release button. In this system, the controller 40 can handle the storage area 34 of the cartridge 12 as if the area were in the internal memory thereof. Consequently, the header data need not be fetched from the cartridge 12 into the internal storage area of the controller 40.

Alternatively, the system may be configured such that when controller 40 detects a condition, for example, by use of the memory type terminal 32, that the memory cartridge is already installed in the apparatus, the system reads out data from the header region 50 into the storage area of the controller 40. In such a system constitution, the shutter release button of the keys and display 48 need not be configured in the two-stroke structure. The operations to be achieved after the acquisition of the header data from the cartridge may be identical to those described above.

As described above, in accordance with the present invention, since the status of a memory cartridge installed in the camera can be automatically confirmed prior to a shooting operation, the operator need not check for the conditions of the cartridge. In consequence, a digital electronic still camera having a high operability is provided. The possibility of destruction and/or loss of stored data due to a mistake of the operator will be minimized.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A digital electronic still camera detachably loaded with a memory cartridge, the camera adapted to shoot an object field to produce image data representing the object field to store the data in the memory cartridge, said memory cartridge having a first storage area for storing therein control data including at least one of indications of a storage capacity, a free area, time when a battery supplying the memory cartridge expires and a write inhibit flag of said memory cartridge, and a second storage area, separate from the first storage area, for sorting therein the image data, the free area being part of the second storage area in which part of any data is not stored, said camera including, imaging means for shooting the object field to produce an image signal representing the object field;

signal convertor means for converting the image signal into digital image data associated with the image signal;

connector means for detachably connecting said memory cartridge to said signal convertor means;

manual operation means responsive to a manual operation for first generating a first instruction signal for preparation for shooting by said imaging means, and next a second instruction signal to instruct a shooting to be achieved by said imaging means; and control means responsive to said manual operation means for controlling said imaging means and said signal convertor means to store the image data in the second storage area of said memory cartridge, said control means, on receiving the first instruction signal from said manual operation means, reading out the control data from the first storage area of said memory cartridge, and, on receiving the second instruction signal, storing in the second storage area of said memory cartridge the image data produced from said signal convertor means in dependence upon the control data thus read out from the first storage are of the memory cartridge.

2. A camera in accordance with claim 1, wherein said signal convertor means compresses the image data to produce data resultant from compression.

3. A digital electronic still camera detachably loaded with a memory cartridge, the camera adapted to shoot an object field to produce image data representing the object field to store the data in the memory cartridge comprising:

a memory cartridge that has a first storage area for storing therein control data including at least one of indications of a storage capacity, a free area, time when a battery supplying the memory cartridge, and a second storage area, separate from the first storage area, for storing therein the image data, the free area being part of the second storage area in which part of any data is not stored, said camera including, imaging means for shooting the object field to produce an image signal representing the object field;

signal convertor means for converting the image signal into digital image data associated with the image signal;

connector means for detachably connecting said memory cartridge to said signal convertor means;

manual operation means for generating an instruction signal to instruct a shooting to be achieved by said imaging means; and control means responsive to said manual operation means for controlling said imaging means and said signal convertor means to store the image data in the second storage area of said memory cartridge, said control means, when said memory cartridge is connected to said connector means, reading out the control data from the first storage area of said memory cartridge, and, on receiving the instruction signal, storing in the second storage area of said memory cartridge the image data produced from said signal convertor means in dependence upon the control data thus read out from the first storage area of the memory cartridge.

4. A camera in accordance with claim 3, wherein said signal convertor means compresses the image data to produce data resultant from compression.

5. A memory cartridge detachably mounted in a digital electronic still camera which can shoot an object field to produce an image signal representing the object field, the image signal being convertible into digital image data associated with the image signal, the digital image data being stored in said memory cartridge, said still camera having manual operation means responsive to a manual operation for first generating a first instruction signal for preparation for shooting an object field, and next a second instruction signal to effect the shooting, said memory cartridge including, storage means comprising a first storage area for storing therein control data including at least one of indications of a storage capacity, a free area, time when a battery supplying the memory cartridge expires and a write inhibit flag of said memory cartridge, and a second storage area, separate from the first storage area, for storing therein the digital image data, the free area being part of the second storage area in which part of any data is not stored; and connector means for detachably connecting memory cartridge to said still camera;

said storage means being operative under the control of said still camera to produce, upon the first instruction signal, the control data means, and store, upon the second instruction signal, the digital image data in dependence upon the control data thus produced.

6. A memory cartridge detachably mounted in a digital electronic still camera which can shoot an object field to produce an image signal representing the object field to produce an image signal representing the object field, the image signal being convertible into digital image data associated with the image signal, the digital image data being stored in said memory cartridge, said still camera having manual operation means for generating an instruction signal to instruct a shooting on an object filed, said memory cartridge including, storage means comprising a first storage area for storing therein control data including at least one of indications of storage capacity, a free area, time when a battery supplying the memory cartridge expires and a write inhibit flag of said memory cartridge, and a second storage area, separate from the first storage area, for storing therein the digital image data, the free area being part of the second storage area in which part of any data is not stored; and connector means for detachably connecting said memory cartridge to said still camera;

said storage means being operative, when connected to said still camera, to produce the control data stored in the first storage area of said storage means, and store, in response to the instruction signal, the digital image data depending upon the control data thus produced.

7. A memory cartridge detachably mounted in a digital electronic still camera which shoots an object field to produce an image signal representing the object field, the image signal being converted into digital image data associated with the image signal, the digital image data being stored in said memory cartridge, the still camera having manual operation means responsive to a manual operation for first generating a first instruction signal for preparation for shooting an object field, and next a second instruction signal to effect the shooting, wherein said memory cartridge comprises:

storage means for storing therein control data representative of a status of said memory cartridge; and connector means for detachably connecting said memory cartridge to said still camera;

said storage means being operative under the control of said still camera to produce, upon the first instruction signal, the control data stored in said storage means, and store, upon the second instruction signal, the digital image data in dependence upon the control data thus produced, said connector means comprising a connector terminal producing a signal representative of a memory type of said storage means.

8. A memory cartridge detachably mounted in a digital electronic still camera which can shoot an object field to produce an image signal representing the object field, the image signal being convertible into digital image data associated with the image signal, the digital image data being stored in said memory cartridge, said still camera having manual operation means for generating an instruction signal to instruct a shooting on an object field, comprising:

said memory cartridge including, storage means for storing therein control data representative of a status of said memory cartridge; and connector means for detachably connecting said memory cartridge to said still camera;

said storage means being operative, when connected to said still camera, to produce the control data stored in said storage means, and store, in response to the instruction signal, the digital image data in dependence upon the control data thus produced, said connector means comprising a connector terminal producing a signal representative of a memory type of said storage means.

* * * * *